United States Patent
Seibold

(10) Patent No.: US 6,394,525 B1
(45) Date of Patent: May 28, 2002

(54) VEHICLE SEAT

(75) Inventor: Kurt Seibold, South Lyon, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/715,579

(22) Filed: Nov. 17, 2000

(51) Int. Cl.⁷ .............................................. B60N 2/04
(52) U.S. Cl. ........................... 296/65.09; 296/65.05; 297/326; 297/335; 297/452.39
(58) Field of Search .................... 296/65.01, 65.05, 296/65.09; 297/344.1, 326, 452.39, 335, 336

(56) References Cited

U.S. PATENT DOCUMENTS

| | | | | |
|---|---|---|---|---|
| 1,206,208 A | * | 11/1916 | Crane | 296/65.09 |
| 1,584,545 A | * | 5/1926 | Johnson | 296/65.09 |
| 1,640,640 A | * | 8/1927 | Bourgon | 296/65.09 |
| 2,318,751 A | * | 5/1943 | Carlson | 296/65.09 X |
| 2,797,732 A | * | 7/1957 | Thomas | 297/326 X |
| 3,317,175 A | * | 5/1967 | Ford | 296/65.05 X |
| 4,091,740 A | * | 5/1978 | Lie | 296/65.05 X |
| 5,240,302 A | * | 8/1993 | Yoshida et al. | 296/65.1 |
| 5,829,836 A | * | 11/1998 | Schumacher et al. | 297/335 X |
| 5,927,808 A | * | 7/1999 | Esker | 296/65.05 X |
| 5,984,397 A | * | 11/1999 | Dawson et al. | 296/65.09 |
| 6,106,066 A | * | 8/2000 | Moffa et al. | 297/332 |

* cited by examiner

Primary Examiner—Stephen T. Gordon
Assistant Examiner—Patricia Engle
(74) Attorney, Agent, or Firm—Foley & Lardner

(57) ABSTRACT

A fold and tumble vehicle seat has a cushion, seatback, and a frame. The frame is supported at the front end by a cantilever that extends perpendicular to the direction that the seat faces. The seat frame is pivotally coupled to the cantilever, allowing the removal of the customary front legs that would otherwise support the seat. A single rear leg is releasably attached to the floor of the vehicle, and a structural latch may be used to attach the frame to a center console. The vehicle seat is pivoted out of the way by folding the seatback forward, and releasing the rear leg to allow the seat to pivot forward about the pivot tube.

34 Claims, 3 Drawing Sheets

CONVENTIONAL SEATING SYSTEM

VEHICLE SEAT

FIELD OF THE INVENTION

The present invention relates to a vehicle seating system. More particularly, the present invention relates to a fold and tumble vehicle seat that pivots about a cantilever extending from a center console of a vehicle.

BACKGROUND OF THE INVENTION

In vehicles such as automobiles, sport utility vehicles, and mini-vans, fold and tumble seating is used to aid in occupant ingress and egress from the vehicle, and provide easier access to storage space behind a row of seats. Typically the rear end of a fold and tumble seat is releasably attached to the floor of the vehicle by a pair of legs. A release mechanism allows the seatback to be folded forward. A second mechanism releases the rear legs such that the folded seat can be tumbled forward toward the front of the vehicle. The fold and tumble operation creates a larger opening into the vehicle.

When the seat is in the tumbled position, the rear legs jut outward toward the rear of the vehicle, presenting a hazard for the occupants of the vehicle, particularly with respect to the rear leg on the outside portion of the seat. To solve this problem, the rear legs of conventional fold and tumble seats have been designed to collapse or fold into the seat frame when the seat is in the tumbled position. The collapsing leg removes the safety hazard.

Conventional fold and tumble seats typically have a frame that is supported at the front and by a pair of brackets or legs that are further supported by the floor of the vehicle. The seat pivots about the points at which it is supported by the front legs. The front legs take up space that could otherwise be used as storage space below the vehicle seat. Two front legs are required because the outside front leg not only supports the seat but resists the bending moment from the load of the occupant and the seat, as well as downward forces during a vehicle crash. If the vehicle crashes while moving in a forward direction, the seatbelt retains the occupant in the seat, resulting in a submarining-type force wherein the front portion of the seat cushion is driven downward toward the floor as the seatback attempts to rotate toward the front of the vehicle.

The space taken up by the front support legs is greater with newer vehicle seats that have taller seatbacks and headrests. Because of the taller seatback and headrest, the points about which the seat pivots as it tumbles forward must be at a greater distance above the floor than in previous designs to prevent the headrest from crashing into the floor in the final fold and tumble configuration. Therefore, the front legs or brackets must be taller as well.

Conventional fold and tumble seats do not typically have a substantial support member that runs orthogonal to the side of the vehicle. This is because the seats are supported by structural members rising from the floor of the vehicle, and therefore substantial cross support members are not required to resist bending moments. A disadvantage of the conventional design is that the seat frame does not afford a great amount of side impact protection in the event of a vehicle crash.

Accordingly, it would be advantageous to have a fold and tumble seat that does not require a rear outside leg that can present a safety hazard to vehicle occupants. Further, it would be advantageous to have a fold and tumble seat that does not have front legs extending to the floor of the vehicle. Further still, it would be advantageous to have a fold and tumble seat that has a substantial structural support running orthogonal to the side of the vehicle to provide side impact protection.

SUMMARY OF THE INVENTION

An exemplary embodiment relates to a vehicle seat having a seat frame with a front portion and a rear portion. A seatback is pivotally coupled to the rear portion, and a cantilever is pivotally coupled to and supports the front portion.

Another embodiment relates to a vehicle having a floor and a plurality of side doors. A cantilever extends in a direction orthogonal to the side doors and is supported by a center console. A seat is pivotally supported on the cantilever.

Still another embodiment relates to a vehicle seat having a seat frame coupled to a vehicle floor. A cushion is coupled to the frame and a seatback is coupled to the cushion or the seat frame. A maximum of one support leg extends between the seat frame and the floor.

BRIEF DESCRIPTION OF THE DRAWINGS

An exemplary embodiment will hereinafter be described with reference to the accompanying drawings, wherein like reference numerals denote like elements, and.

DETAILED DESCRIPTION OF THE PREFERRED EMBODIMENTS

Figure 1:
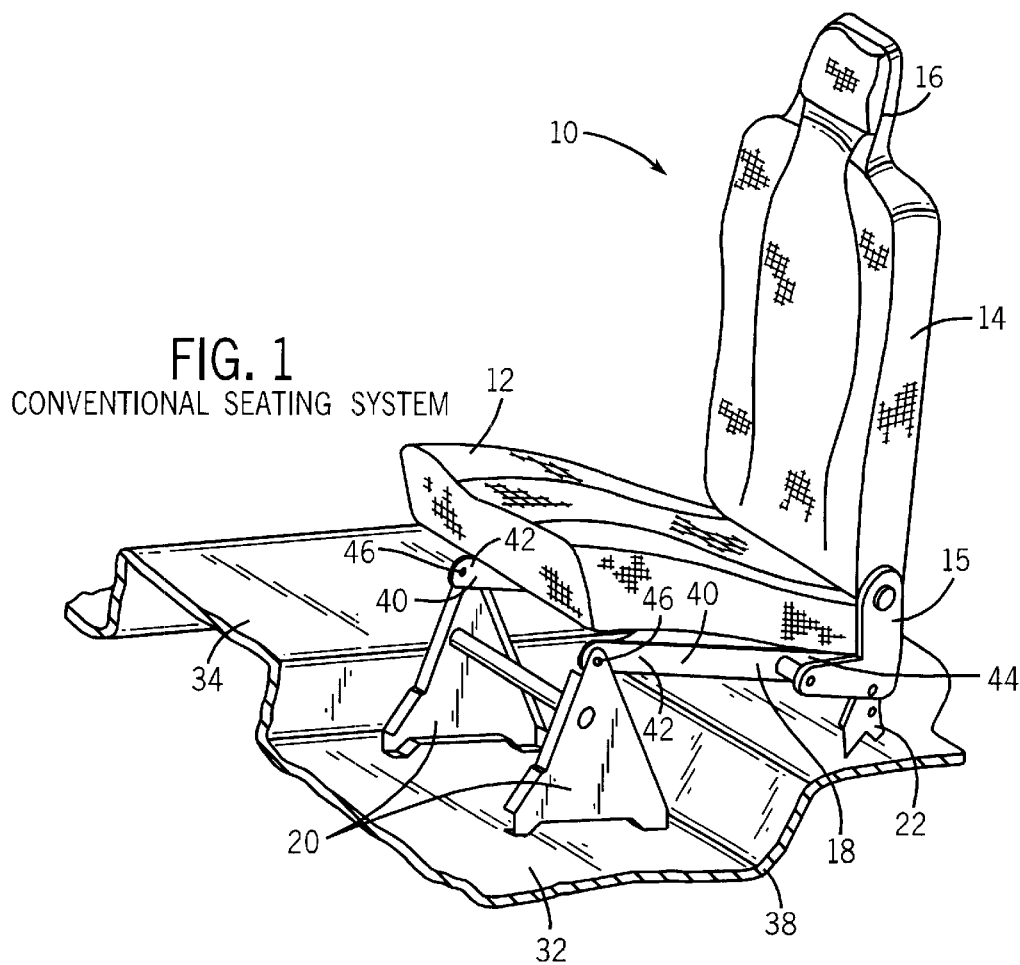
FIG. 1 is a perspective view of a conventional fold and tumble seating system.

Referring to FIG. 1, a seat 10 has a cushion 12, a seatback 14, a headrest 16, and a frame 18. The cushion 12 can have a cushion frame (not shown). The seatback 14 can be pivotally coupled to the cushion frame or directly to the frame 18 by a pair of brackets 15. The frame 18 is supported by two pairs of legs 20, 22.

Further shown in FIG. 1, in a vehicle there can be a floor 32, a number of seats 10, and a center console 34. The center console 34 can include a middle seat (not shown). The seat 10 and center console 34 can be located in any row of the vehicle. The vehicle body has cut-outs 38 to accommodate side doors (not shown).

A conventional seat frame 18 has a pair of side rails 40 coupled to the legs 20, 22. A front end 42 of each of the side rails 40 is pivotally coupled to the pair of front legs 20. The front legs 20 are secured to the floor 32. Rear ends 44 of the rails 40 are coupled to the pair of rear legs 22. The rear legs 22 are releasably secured to the floor 32. The rear legs 22 are releasably coupled to the floor 32 so that the seat 10 may be tumbled forward, pivoting about a pair of front pivot points 46.

The seat 10 is designed to fold and tumble forward to aid in occupant ingress and egress. The seatback 14 is first folded forward onto the seat cushion 12. The rear legs 22 are then released from the floor 32 to allow the folded seat 10 to be tumbled forward about the front pivot points 46. The fold and tumble operation results in a collapsed configuration of the seat 10 wherein the headrest 16 is positioned proximal the floor 32, and the rear legs 22 face rearward.

Figure 2:
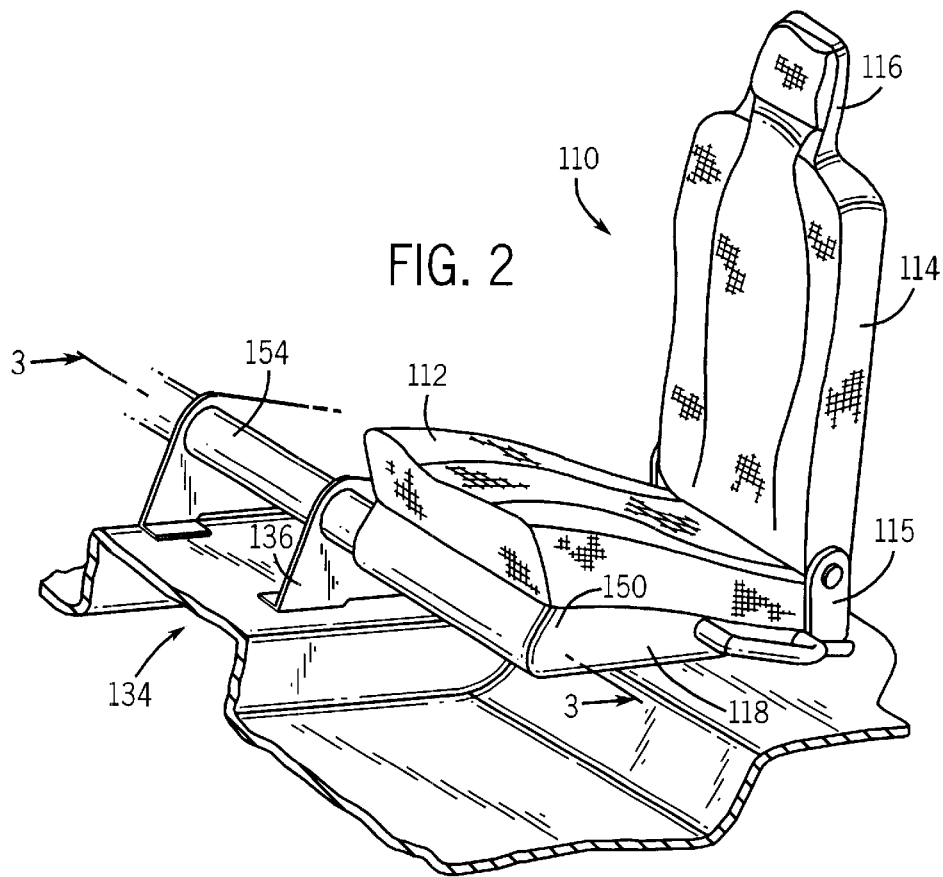
FIG. 2 is a perspective view of an improved fold and tumble seating system.

Referring to FIG. 2, an improved seat 110 is shown. The improved seat 110 has a cushion 112, a seatback 114, and a headrest 116 in the same configuration as the seat 10 depicted in FIG. 1. A pair of brackets 115 pivotally couple the seatback 114 to a cushion frame or the seat frame 118.

The frame 118 has a front portion 150 that is pivotally coupled to a cantilever, shown as a pivot tube 154. The pivot tube 154 extends into the frame 118 from a center console 134. Thus, the front portion 150 of the frame 118 is supported by a portion of the pivot tube 154 that is cantilevered off the center console 134. Alternatives to the pivot tube 154 can include any cantilever structure, such as a beam.

The center console 134 has an associated frame 136 designed to support the pivot tube 154. Also attached to the center console frame 136 can be a storage system, an armrest, or a middle seat.

Figure 3:
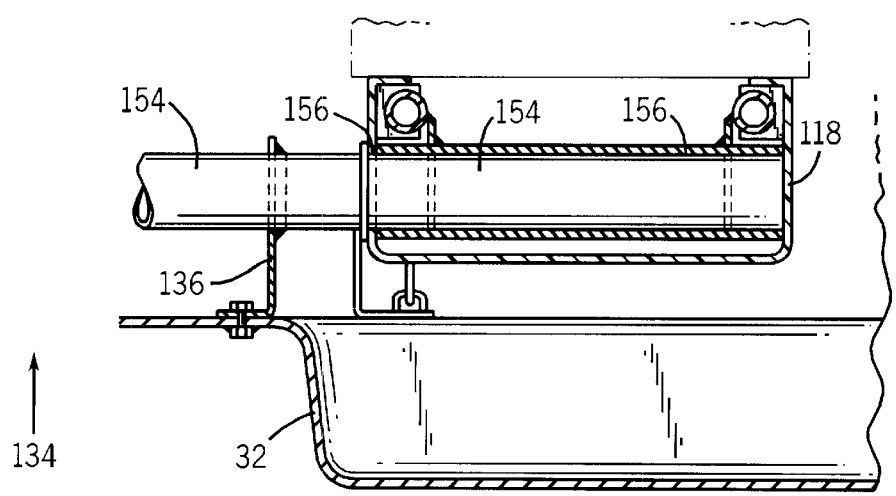
FIG. 3 is a sectional view taken generally along line 3—3 of FIG. 2.

Referring to FIG. 3, the frame 118 is supported by the pivot tube 154. A frame bearing surface 156 can be provided at multiple points, or continuously across the frame 118 to support the mass of the seat 110. Thus, the frame 118 can pivot about a plurality of bearing surfaces 156 or about an axis stabilized by the pivot tube 154. As an alternative embodiment to having the frame 118 bearing directly on the pivot tube 154, the pivot tube 154 can have attached brackets that pivotally support the frame 118. This alternative embodiment is useful when the cantilever 154 is not a cylindrical member.

Figure 4:
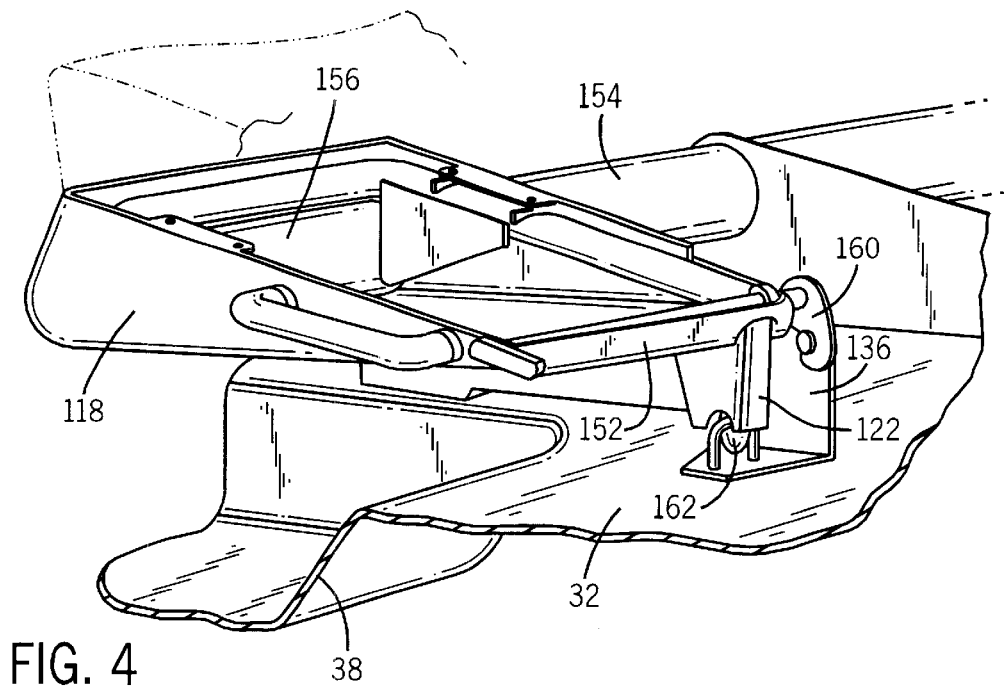
FIG. 4 is a perspective view from the rearward direction of the frame of the improved fold and tumble seating system.

Referring to FIG. 4, a rear portion 152 of the frame 118 can be supported by a support member, shown as a rear leg 122. A support bracket, shown as a structural latch 160, may be used to provide additional structural support, for example, to carry a seatbelt. The structural latch 160 aids in stabilizing the seat 110 with respect to torsional forces. The rear leg 122 can be supported by the floor 32. A release mechanism 162 permits the detachment of the rear leg 122 to tumble the seat 110. The structural latch 160 is attached to the center console frame 136, and also selectively releases from the center console frame 136.

Figure 5A:
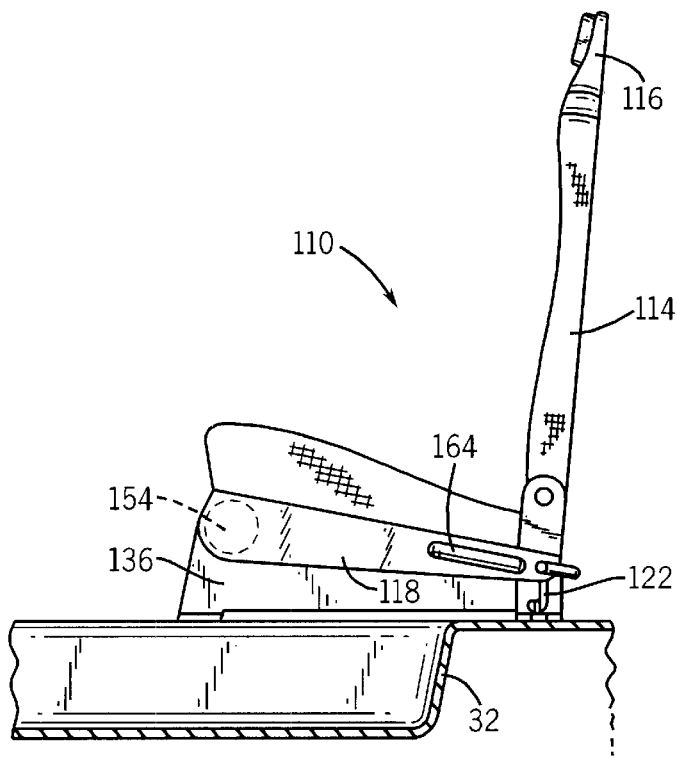
FIG. 5A is a side view of an improved fold and tumble seating system in an upright position.
Figure 5B:
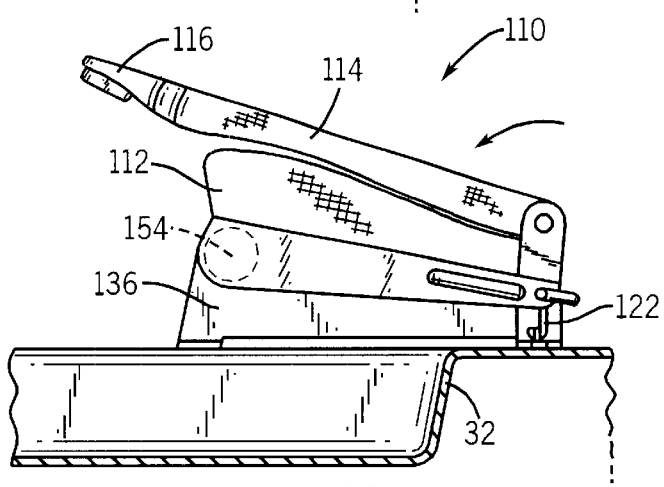
FIG. 5B is a side view of an improved fold and tumble seating system in a folded position.
Figure 5C:
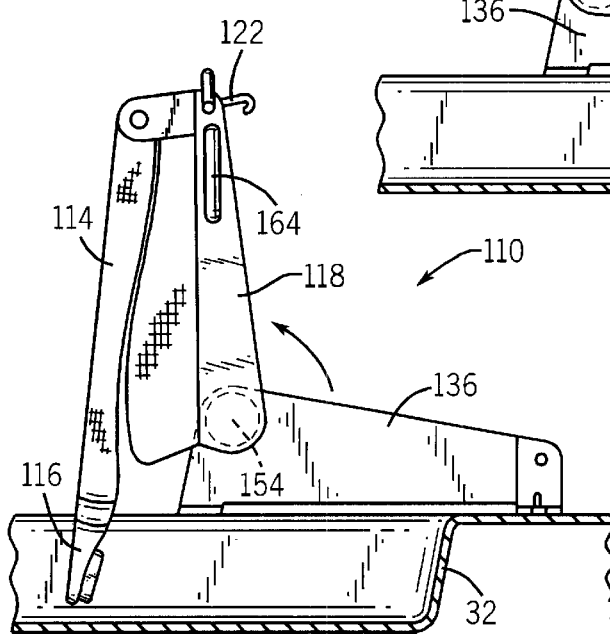
FIG. 5C is a side view of an improved fold and tumble seating system in a folded and tumbled position.

Referring to FIGS. 5A, 5B, and 5C, the improved seat 110 folds and tumbles in a similar fashion to the conventional seat shown in FIG. 1. FIG. 5A shows the seat 110 in a standard operative position. The seatback 114 can be folded forward onto the seat cushion 112 in the direction shown by the arrow in FIG. 5B. A release mechanism (not shown) can be operated to release the seatback 114 from the operative position to effect the folding motion.

Referring to FIG. 5C, the seat 110 is shown in the tumbled position. The seat 110 is placed into the tumbled position by first operating the rear leg 122 release mechanism 162 (FIG. 4). The rear leg 122 releases from the floor 32, and the structural latch 160 (FIG. 4) releases the rear portion 152 to allow the frame 118 to pivot about the pivot tube 154 in a forward direction (shown by the arrow in FIG. 5C). A handle 164 can be used to aid in tumbling the seat.

The improved seat 110 permits more storage room below the seat 110 because the conventional front legs 20 have been removed (compare FIG. 1 to FIG. 2).

The pivot tube 154 has a large diameter to withstand the bending moment on the tube due to the removal of the front legs 20. The pivot tube 154 must maintain the integrity of the frame 118 both during normal vehicle operations as well as during a vehicle crash.

Referring to FIG. 4, it can be seen that the two conventional rear legs 22 have been removed in the improved design and replaced with a single rear leg 122, which is positioned adjacent the center console 134 rather than toward the outside of the vehicle. Therefore, when the seat 110 is in the tumbled configuration, there is no longer a rear outside leg 22 to interfere with occupants entering or exiting the vehicle. The remaining rear leg 122 is positioned proximate the center console 134 such that it does not interfere with occupants. If desired, the rear leg 122 can be designed to collapse or fold into the frame 118 when the seat 110 is in the tumbled position.

The improved seat 110 can be used in the front row of the vehicle, or rearward rows in vehicles with more than two rows of seats.

Thus, the improved seat 110 solves the disadvantages of conventional fold and tumble seats discussed in the Background of the Invention section. One of the rear legs 22 has been removed, and the remaining rear leg 122 is disposed toward the interior of the vehicle, removing the obstruction and safety hazard of a rear leg 22 jutting outward in the path of travel when the conventional seat 10 is in the tumbled configuration. Further, the improved fold and tumble seat 110 does not have front legs 20, increasing the amount of storage space below the seat 110. Further, the pivot tube 154 enhances the structural integrity of the seat 110, particularly with respect to side impact vehicle crashes.

While several embodiments of the invention have been described, it should be apparent to those skilled in the art that what has been described is considered at present to be the preferred embodiments of a fold and tumble seating system. However, changes can be made in the design without departing from the true spirit and scope of the invention. The following claims are intended to cover all such changes and modifications that fall within the true spirit and scope of the invention.

What is claimed is:

1. A vehicle seat, comprising:
    a seat frame having a front portion and a rear portion;
    a seatback pivotally coupled to the rear portion; and
    a cantilever pivotally coupled to and supporting the front portion whereby the rear portion pivots about the front portion.

2. The vehicle seat of claim 1, wherein the seat is disposed in a front row of a vehicle.

3. The vehicle seat of claim 1, wherein the seat is disposed in a second row of a vehicle.

4. The vehicle seat of claim 1, wherein the seat is disposed in a third row of a vehicle.

5. The vehicle seat of claim 1, wherein the cantilever is pivotally coupled to the seat frame at a plurality of points.

6. The vehicle seat of claim 1, further comprising:
    a rear support leg coupled to the rear portion.

7. The vehicle seat of claim 6, wherein the rear support leg is releasably coupled to a floor of a vehicle.

8. The vehicle seat of claim 7, wherein the rear support leg is collapsible into the seat frame.

9. The vehicle seat of claim 6, wherein the rear support leg is disposed adjacent to a center console.

10. The vehicle seat of claim 1, wherein the front portion of the seat frame is exclusively supported by the cantilever such that a plurality of front legs are not required.

11. The vehicle seat of claim 1, further comprising a support bracket coupling the seat frame and a center console.

12. The vehicle seat of claim 1, wherein the cantilever is a pivot tube.

13. The vehicle seat of claim 1, where in the cantilever is a beam.

14. A vehicle, comprising:
   a floor,
   a plurality of side doors;
   a cantilever structure extending in a direction orthogonal to the side doors, supported by a center console; and
   a seat pivotally supported on the cantilever structure.

15. The vehicle of claim 14, wherein the center console includes a middle seat.

16. The vehicle of claim 14, wherein the seat is a front row seat.

17. The vehicle of claim 14, wherein the seat is a second row seat.

18. The vehicle of claim 14, wherein the seat is a third row seat.

19. The vehicle of claim 14, further comprising:
   a rear support extending from the seat and releasably secured to the floor.

20. The vehicle of claim 19, wherein the rear support is located adjacent the center console.

21. The vehicle of claim 19, wherein the rear support is configured to fold into the seat.

22. The vehicle of claim 14, wherein the cantilever structure is supported by the center console.

23. The vehicle of claim 14, wherein the seat is coupled to the cantilever structure at multiple locations.

24. The vehicle of claim 14, further comprising:
   a second rear support coupling the seat to the center console.

25. The vehicle of claim 14, wherein the cantilever structure is a pivot tube.

26. The vehicle of claim 14, wherein the cantilever structure is a beam.

27. A vehicle seat configured to support an occupant facing in a forward direction, comprising:
   a seat frame;
   a cushion coupled to the seat frame;
   a seatback coupled to the cushion or the seat frame;
   a cantilevered support means for pivotally supporting the seat frame having a longitudinal axis orthogonal to the forward direction whereby the seat frame pivots about the longitudinal axis of the cantilevered support means; and
   a support leg coupled to a rear portion of the seat frame.

28. The vehicle seat of claim 27, wherein the cantilevered support means is a cantilever pivotally coupled to the seat frame.

29. The vehicle of claim 28, wherein the seat frame has a plurality of bearing surfaces pivotally supported by the cantilever.

30. The vehicle seat of claim 27, wherein the support leg is adjacent a center console.

31. The vehicle seat of claim 27, wherein the support leg is collapsible into the seat frame.

32. The vehicle seat of claim 27, further comprising:
   a support bracket releasably coupling the seat frame to a center console.

33. The vehicle seat of claim 27, wherein the cantilevered support means is a pivot tube.

34. The vehicle seat of claim 27, wherein the cantilevered support means is a beam.

* * * * *